M. EHLERT.
BRAKE FOR CARRIAGES.
APPLICATION FILED OCT. 15, 1906.
898,566.
Patented Sept. 15, 1908.
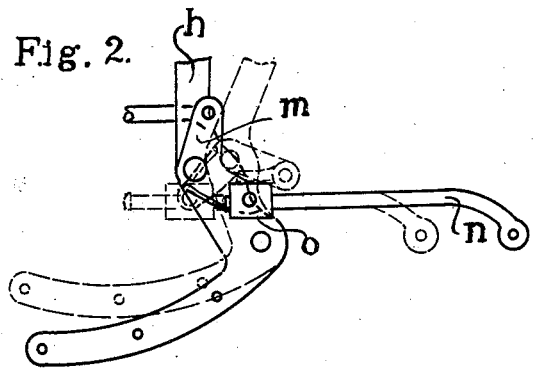
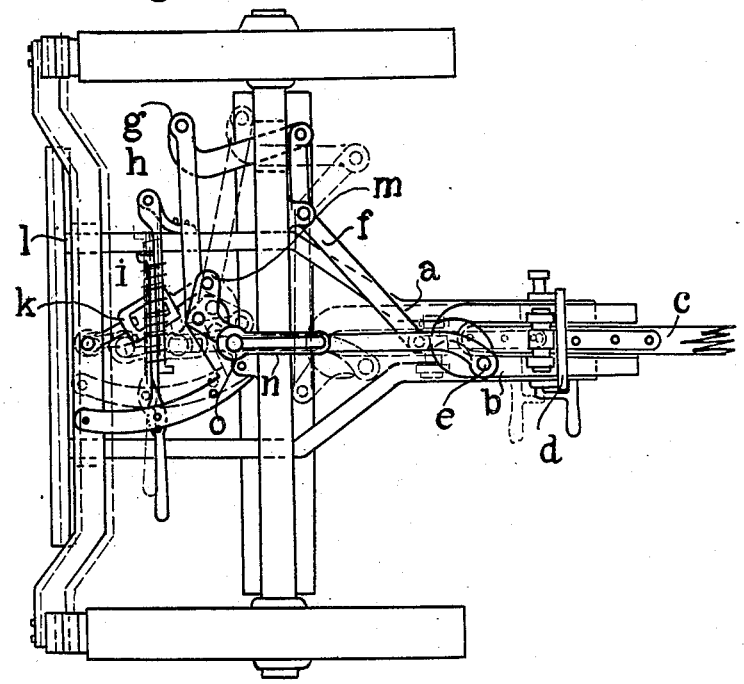

UNITED STATES PATENT OFFICE.

MAX EHLERT, OF HANOVER, GERMANY.

BRAKE FOR CARRIAGES.

No. 898,566.　　　　　Specification of Letters Patent.　　　Patented Sept. 15, 1908.

Application filed October 15, 1906. Serial No. 339,116.

*To all whom it may concern:*

Be it known that I, MAX EHLERT, a subject of the Emperor of Germany, residing at Hanover, Germany, have invented a new and useful Brake (Stopper) for Carriages, of which the following is a specification.

The object of my present invention relates to brakes for carriages operating selfactingly during a drive on inclined roads or when stopping the horses.

The brake is worked by means of springs. Its selfacting operation is caused by the backward or forward sliding of the carriage pole in its fastening thill. The pressure of the spring operating the brake is adjustably arranged. The brake-blocks are mounted, if disengaged, by a special device so far from the carriage wheels that they can not wear out on one side by the rotation of the wheels.
In the accompanying drawing, in which I have illustrated my invention, like letters of reference refer to like parts throughout the different views.

In said drawings, Figure 1 illustrates a plan view of my improved brake and its application to the front wheel of a carriage. Fig. 2 shows a detail of the lever $m$ on an enlarged scale.

In the fastening thill $a$ of the carriage pole I provide a sliding carriage $b$ to which the carriage pole $c$ is connected. The sliding carriage $b$ can be adjusted in its foremost position by a turnable arm $d$ engaging a stop in order to prevent the operation of the brake if the carriage is driven backwards. The motion of the sliding carriage $b$ is transmitted by a link $e$ to an angle lever $f$ pivotally linked to the frame of the wagon said angle lever on its part being connected by a link $g$ with another angle lever $h$ also pivotally fastened to the frame of the wagon. The free end of the lever $h$ undergoes the action of a spring $i$ the opposite end of which is supported by the frame of the wagon. Close to the pivot of the lever $h$ I connect on the arm fastened to the link $g$ a rod $k$ adjustable in its length, the free end of which being pivotally connected to the beam $l$ carrying the brake blocks.

If the sliding carriage $b$ is now pressed backward by means of the backward motion of the carriage pole caused by the pulling back of the horses, the single parts of the brake mechanism adopt the position shown in the figure by dotted lines. The spiral spring $i$ acts on the free arm of angle lever $h$ whereby the beam $l$ with its brake blocks is pressed against the circumference of the carriage wheels by the other arm of said lever corresponding to the force of the spring. If the horses pull the carriage pole again forward the sliding carriage $b$ again slides into its foremost position shown in the drawing in full lines. The force of the spring is overcome and the brake returns with its brake blocks to its original position by means of the motion of the lever $h$. In order to enlarge this releasing movement I do not directly connect the rod $k$ with the lever $h$ but arrange between said parts an angle lever $m$ rotating on the pivot of the lever $h$. The one arm of the lever $m$ is connected to the rod $k$ the other arm to a slitted rail $n$. The rail $n$ is turnably connected by means of the intermediate link $e$ to the sliding carriage $b$. The free arm of the lever $m$ carries a button having a flattened neck which is guided in the slit of the rail $n$. The button can turn in an enlargement at the end of the slit thus using the mouth of the slit as support.

As shown in Fig. 2 I can replace the rail $n$ by a rod of circular cross-section. In this construction I replace the button $o$ by a block $o$ turnably mounted on the free arm of the lever $m$ and providing a bore hole for the rod $n$ to pass through.

If the brake is operated the rod $n$ does not influence the lever $m$. The arm of the lever connected to the rod $k$ rests with the pivot connecting arm and rod against the angle lever $h$.

The brake operates as above described. If the horses now pull on the carriage $b$ it slides to its foremost position whereby the brake is again disengaged. During this motion the button $o$ slides so far in the slit of the rail $n$ until it pushes against the closed end of the slit. If the sliding carriage $b$ is now further advanced the lever $m$ is laid around whereby the pivot connecting the rod $k$ and the one arm of the lever $m$ fits into a hole of the one arm of the lever $h$. This action removes the beam $l$ with the brake blocks a good distance from the circumference of the wheels. If the brake is again operated the mouth of the slide of the rod $n$ first exercises a pressure during the backward motion of the carriage $b$ whereby the lever $m$ before applying the brakes returns into the position shown in the drawing in full lines. In this position the brake blocks nearly rest against the circumference of the wheels of the wagon. The action of the angle lever $m$ can be also caused by other means than above described. The interrupting motion of the rod $n$ could be attained by correspondingly located stops mounted on the sliding carriage $b$ operating on the rod only during a part of its motion.

The free arm of the lever $h$, on which the spiral spring $i$ acts, preferably adopts the shape of an arc, the center point of which forming a support for said spring. By means of adjusting the points of action of the spring on the arm of the lever I can strengthen or weaken the effect of said spring. Besides I can give the arm of the lever $h$ such form that I am able to adjust the spring $i$ from the rear side of the wagon. The draw spring $i$ is preferably replaced by two rods resting along each other whereby the bent ends of both rods act under the influence of a pressure spring. This arrangement is adapted to overcome a tearing of said spring. The free end of the one rod is fastened to the frame of the wagon while the other rod, the free end of which forms a handle, catches with a sideward projection behind the arm of the lever $h$. Pins placed in bore holes of said arm and in a bore hole of the rod secure a sufficient fastening of the same.

What I claim as new and desire to secure by a United States Letters Patent is:—

1. In a brake for carriages in which the brake blocks are operated by means of a spring at a repulling of the carriage pole, the combination of a sliding carriage ($b$) located in the thill of the wagon, means to fasten the carriage pole to said sliding carriage, a spring, a system of levers and links connecting said sliding carriage with said spring, means to cause the spring to act on the free arm of the last angle lever ($h$), a draw rod ($k$), and means to operate the beam carrying the brake blocks by the motion of said draw rod ($k$) substantially as and for the purpose set forth.

2. In a brake for carriages, in which the brake blocks are operated by means of a spring at a repulling of the horses, the combination of a beam carrying the brake blocks, an adjustable draw rod ($k$) connected to said beam, a system of levers, a second angle lever ($m$) connecting the angle lever $h$ with the draw rod, and means to remove the brake blocks a good distance from the circumference of the wagon wheels, substantially as and for the purpose set forth.

In witness whereof I have hereunto signed my name this 24 day of August 1906 in the presence of two subscribing witnesses.

MAX EHLERT.

Witnesses:
H. BÖTTCHER,
J. GRETEMANN.